(12) United States Patent
Rankin

(10) Patent No.: X8562
(45) Date of Patent: Dec. 24, 1834

(54) BRICK, MOULDING

(76) Inventor: Robert Rankin

Robert Rankin

The schedule refered to in these Letters Patent and
making part of the same containing a description in the
words of the said Robert Rankin himself of his improve
ment in the machine for moulding Bricks To all whom it may concern. Be it known that I
Robert Rankin, of Frankfort in the County of Waldo and State
of Maine have invented certain improvements in
the Machine for Moulding Bricks and that the
following is a full and exact description thereof, A frame is made of such size and strength as may be
necessary, according to the power to be applied, In one
which I have constructed the foundation or ground sill
consists of a horizontal frame about six feet long, and
three feet eight inches wide. Into this four vertical posts
are framed which rise to the height of eight feet: two of
these rise from one end of the side sill and the other
two at the distance of three feet eight inches from them,
measured from out to out. These posts are enclosed
so as to form a box which is to contain the Clay to be
mixed and moulded. The bottom of this box is two feet
above the ground, & its height four; the inside of it is
round and the mixing well has a vertical shaft
furnished with knives or cutters is to revolve within it
corresponding knives or rods, projecting from the inside
in a way well known to those acquainted with the pre-
paring of Clay, for bricks, pottery or other purposes.
The vertical shaft has a step in the bottom of the circular
box, and is supported at the top in the usual way, it
is to be turned by means of a sweep or lever by animal
power or otherwise. Near the top of this shaft and just
below the sweep there is a wheel which [illegible] a crown wheel
firmly fixed on and turning with it. This wheel is
four four feet two inches in diameter and one foot thick,
and upon it are formed an eccentric groove, inclined
planes, & cams by which motion is to be communicated
to the moulding part of the Machine. The prepared Clay
passes through an opening left in the front side of the mix-
ing well close to the bottom, into a box, on what I call the
front of the Machine. The follower by which the moulding
is effected rises and falls in the box which is of such len-
gth and width as may be necessary for moulding the
bricks say for six bricks thirty inches long and one
foot wide. The bottom of this box is divided by cross bars
so as to form a kind of hopper or funnel to direct the
Clay into the mould beneath it. The follower is attached
to the vertical shaft which is raised by the cam wheel
For this purpose it has near its periphery two inclined
planes opposite to each other; upon the upper side of this
wheel a friction roller runs, which roller turns on a pin
projecting at right angles from the inner side of the fol-
lower shaft, As the wheel turns this roller arrives at
the vertical side of the cavities which rises from the incli-
ned planes and the follower being loaded the shaft falls &
the bricks are moulded, the inclined planes then causes
the follower to rise by its action on the friction roller.
The follower is made double the lower part which first
comes in contact with the Clay by the falling of the shaft
strikes a blow upon it which materially aids the fil-
ling of the moulds and this part is attached to the upper
one by sliding bolts which admits the second part which
is heavily loaded to come down upon it and complete
the pressure. The moulds are placed by hand upon a bed
which forms the lower end of a vertical vibrating frame,
the upper end of which is even with the upper ~~surf~~ surface of
the cam wheel by which the vibration is effected.
The For this purpose there is an eccentric groove made on the
upper surface of the wheel, and an arm projects horizon-
tally back from the upper end of the vibrating frame, hav-
ing on it a friction roller which drops into the eccentric
groove the latter being so formed as to throw the lower
end with its moulded bricks twice out in every rev-
olution between the periods of moulding, The vibrating
frame is held in a groove which serves as a fulcrum at
about one third of its length from the upper end, The
bed at its lower end which sustains the pressure rests
upon two rails upon which it slides in and out —
Immediately after the moulding is effected a plate of metal
as long as the moulds slides over them and cuts off the
superfluous Clay acting thus for the part of a stricker;
This sliding plate or cutter lies directly under the bot-
tom of the mixing [illegible] and it is pushed forward, and
drawn back at the proper periods by means of cams or
eccentric grooves on the lower part of the cam wheel, These
act upon a lever vibrating on a fulcrum, the lower
end of which lever is attached to the apparatus for cutting
off the Clay & draws it backward and forwards, the
cutter slides in a box or trough, having ledges which en-
able it to contain water a portion of which being con-
stantly applied to the cutter causes it to perform its of-
fice smoothly and without clogging, ¶ Certain
parts of the apparatus described may be arranged in a man-
ner varying from that set forth and the proportions of the
various parts may be altered, whilst the principle of action
remains substantially the same and I do not intend
therefore to limit myself in these particulars, But what
I claim as my own invention and for which I ask a patent
is the eccentric motion on the cam wheel for vibrating the
front frame as described, the double follower by which

United States Patent

Patent No.: X8562 a blow is first struck upon the metal and heavy pressure
afterwards made, — The sliding cutter with its appendages
operating in the manner described, and the general arrange-
ment & combination of the respective parts by which this ma-
chine differs in its character from all others previously
used for the same purpose Witnesses H. B. Fleet W. Smith Robert [illegible]

[illegible] 1837 John Page